US012612884B2

(12) United States Patent
Saito et al.

(10) Patent No.: US 12,612,884 B2
(45) Date of Patent: Apr. 28, 2026

(54) FLOW CONTROL RESTRICTOR

(71) Applicant: YAMABIKO CORPORATION, Tokyo (JP)

(72) Inventors: Tamotsu Saito, Tokyo (JP); Tomoyoshi Kudo, Tokyo (JP); Yuta Onuma, Tokyo (JP); Ryosuke Imai, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 307 days.

(21) Appl. No.: 18/344,012

(22) Filed: Jun. 29, 2023

(65) Prior Publication Data

US 2024/0026842 A1 Jan. 25, 2024

(30) Foreign Application Priority Data

Jul. 20, 2022 (JP) ................................ 2022-115822

(51) Int. Cl.
*F02M 19/04* (2006.01)

(52) U.S. Cl.
CPC .................................. *F02M 19/04* (2013.01)

(58) Field of Classification Search
CPC ...................................................... F02M 19/04
See application file for complete search history.

(56) References Cited

U.S. PATENT DOCUMENTS 8,286,614 B2 * 10/2012 Zbytowski ............ F02M 19/04 137/382.5
2009/0145408 A1 6/2009 Zbytowski
2016/0186692 A1 6/2016 Suzuki
2020/0049106 A1 * 2/2020 Ryuzaki ................ F02M 19/04
2021/0164419 A1 * 6/2021 Saito ....................... F02M 3/10

FOREIGN PATENT DOCUMENTS

JP H11351065 A 12/1999
JP 2016098777 A 5/2016

OTHER PUBLICATIONS

Notice of Submission of Publications for JP2022-115822, dated Feb. 28, 2024, shipment date of Mar. 5, 2024.
Written Submission of Publications for JP2022-115822, reception date of Feb. 28, 2024.
Office Action pertaining to corresponding Japanese Patent Application No. 2022-115822, mailed Jan. 30, 2026.

* cited by examiner

*Primary Examiner* — Robert A Hopkins
(74) *Attorney, Agent, or Firm* — GRUMBLES LAW PLLC; Brittany Haanan

(57) ABSTRACT

A flow control restrictor includes: a needle valve; and a limit cap which is made of metal and attached to the needle valve. In the needle valve, a first shaft portion which is made of metal and screwed into a regulation hole and a second shaft portion which is made of metal and housed inside the regulation hole are formed. On the second shaft portion, a first projection-and-recess portion is formed, and a pressed portion made of resin is provided on the first shaft portion side relative to the first projection-and-recess portion. The limit cap is fitted onto the second shaft portion. On the limit cap, a projecting portion which is inserted into a restriction groove of the regulation hole and a second projection-and-recess portion which is engaged with the first projection-and-recess portion are formed. The pressed portion is pressed against an inner peripheral surface of the limit cap.

4 Claims, 7 Drawing Sheets

FLOW CONTROL RESTRICTOR

BACKGROUND OF THE INVENTION

Field of the Invention

The present invention relates to a flow control restrictor for use in regulating an air-fuel ratio of an air-fuel mixture.

Description of the Related Art

Carburetors of internal combustion engines are equipped with flow control restrictors for regulating the air-fuel ratios of the air-fuel mixtures. A flow control restrictor includes: a needle valve which is screwed into a thread groove in a regulation hole communicating with a flow passage of the carburetor; and a limit cap which is fitted onto the needle valve. Then, a first projection-and-recess portion formed on an outer peripheral surface of the needle valve and a second projection-and-recess portion formed on an inner peripheral surface of the limit cap are engaged with each other in a circumferential direction, so that the needle valve and the limit cap rotate in conjunction with each other.

In the above-described flow control restrictor, by rotating the needle valve around the axis to adjust the amount of protrusion of the needle valve into the flow passage, it is possible to increase or decrease the flow rate of a fuel flowing through the flow passage.

In addition, a projecting portion is formed on an outer peripheral surface of the limit cap, and this projecting portion is inserted into a restriction groove formed in an inner peripheral surface of a regulation hole. Then, the movement of the projecting portion is restricted by the restriction groove, so that the rotation of the needle valve is restricted.

As the above-described flow control restrictor, there is one in which the limit cap is fixed to the needle valve by fitting an annular member onto the outer peripheral surface of the limit cap, which is fitted onto the needle valve, and inserting a projecting portion formed on an inner peripheral surface of the annular member into a groove portion of the outer peripheral surface of the needle valve (see, for example, Patent Literature 1).

PRIOR ART DOCUMENT(S)

[Patent Literature(s)]

Patent Literature 1: JP2009-138652A

SUMMARY OF THE INVENTION

In the configuration in which an annular member is fitted onto a limit cap and the limit cap is fixed to a needle valve as in the above-described conventional flow control restrictor, there is a problem that the work for assembling the needle valve and the limit cap is cumbersome.

An object of the present invention is to provide a flow control restrictor that solves the above-described problem and allows a needle valve and a limit cap to be easily assembled.

In order to achieve the above-described object, the present invention is a flow control restrictor comprising: a needle valve which is inserted into a regulation hole formed in a fuel regulating device; and a limit cap which is made of metal and attached to the needle valve. In the needle valve, a first shaft portion which is made of metal and screwed into a first hole portion formed on an inner side of the regulation hole, and a second shaft portion which is made of metal and housed inside a second hole portion formed on an outer side of the regulation hole are formed. A first projection-and-recess portion is formed on an outer peripheral surface of the second shaft portion, and a pressed portion which is made of resin is provide on the first shaft portion side relative to the first projection-and-recess portion on the outer peripheral surface of the second shaft portion. The limit cap is fitted onto the second shaft portion. A projecting portion which is inserted into a restriction groove for rotation restriction which is formed in an inner peripheral surface of the second hole portion is formed on an outer peripheral surface of the limit cap. A second projection-and-recess portion which is engaged with the first projection-and-recess portion in a circumferential direction of the limit cap is formed on an inner peripheral surface of the limit cap. The pressed portion of the needle valve is pressed against the inner peripheral surface of the limit cap.

In the flow control restrictor of the present invention, it is possible to restrict rotation of the needle valve by attaching the limit cap to the needle valve, inserting the projecting portion of the limit cap into the restriction groove of the regulation hole, and restricting movement of the projecting portion with the restriction groove.

In the flow control restrictor of the present invention, the pressed portion which is made of resin is provided on the needle valve, and since the limit cap can be fixed to the needle valve by press-fitting this pressed portion into the limit cap, the limit cap can be easily mounted to the needle valve.

DETAILED DESCRIPTION OF THE EMBODIMENTS

An example of an embodiment of the present invention is described in detail with reference to the drawings as appropriate.

Figure 1:
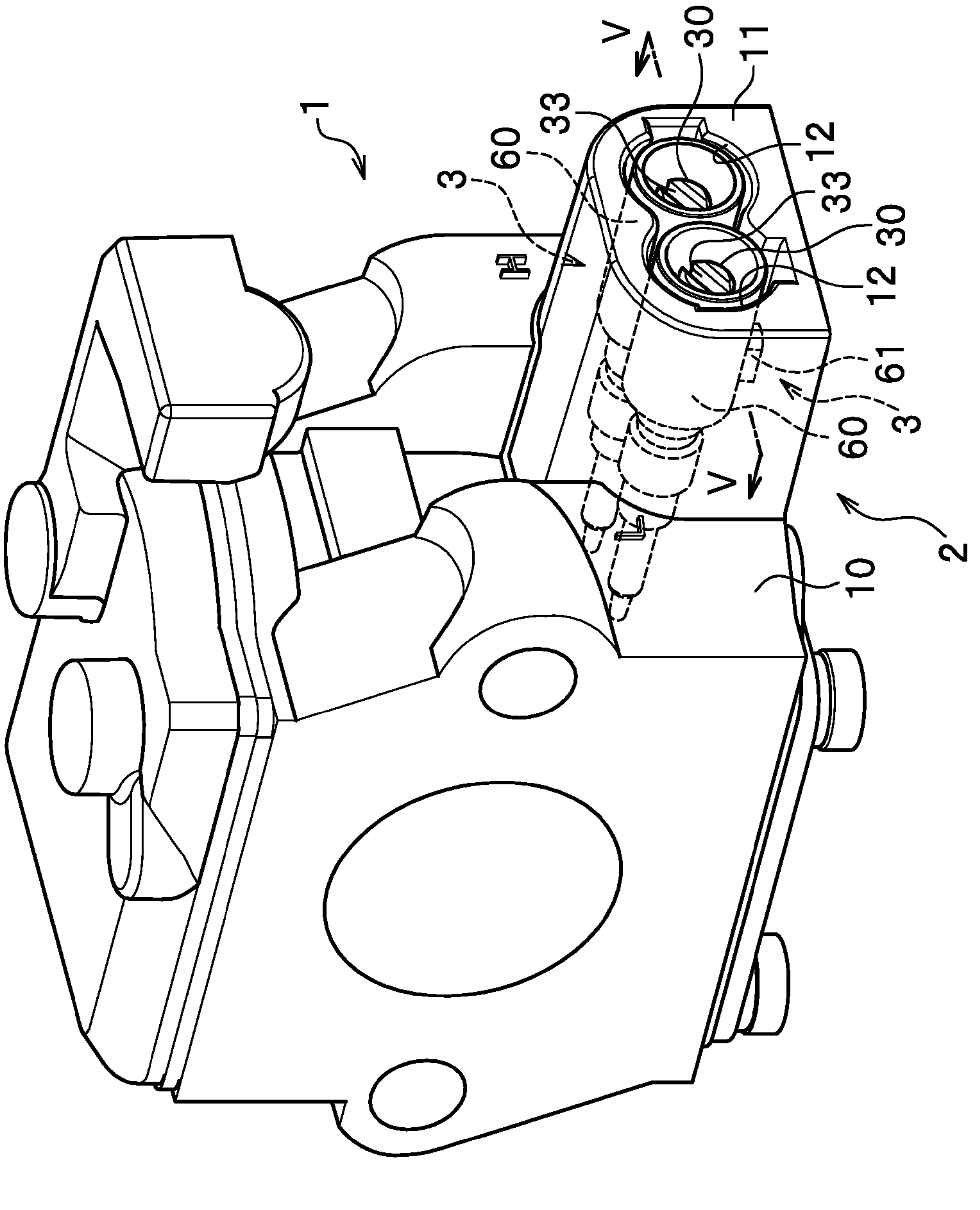
FIG. 1 is a perspective view showing a fuel regulating device according to an embodiment of the present invention.

A fuel regulator 2 of the present embodiment is used in a fuel regulating device 1 as shown in FIG. 1. The fuel regulating device 1 of the present embodiment is a carburetor (an intake device) of an internal combustion engine of a small-sized working machine such as a chainsaw or a blower, for example.

The fuel regulator 2 includes: a main body portion 10; and flow control restrictors 3 mounted into regulation holes 12 formed in the main body portion 10.

The main body portion 10 is a single member which is made of metal and formed by casting. Inside the main body portion 10, a flow passage (not shown) for generating an air-fuel mixture of a fuel and air is formed.

On a front-end surface of a protruding portion 11 formed on a front surface of the main body portion 10, two regulation holes 12 and 12 are open. The regulation holes 12 and 12 are arranged side by side in a lateral direction. Each regulation hole 12 is a through-hole which communicates with the flow passage through which the fuel flows.

Figure 6:
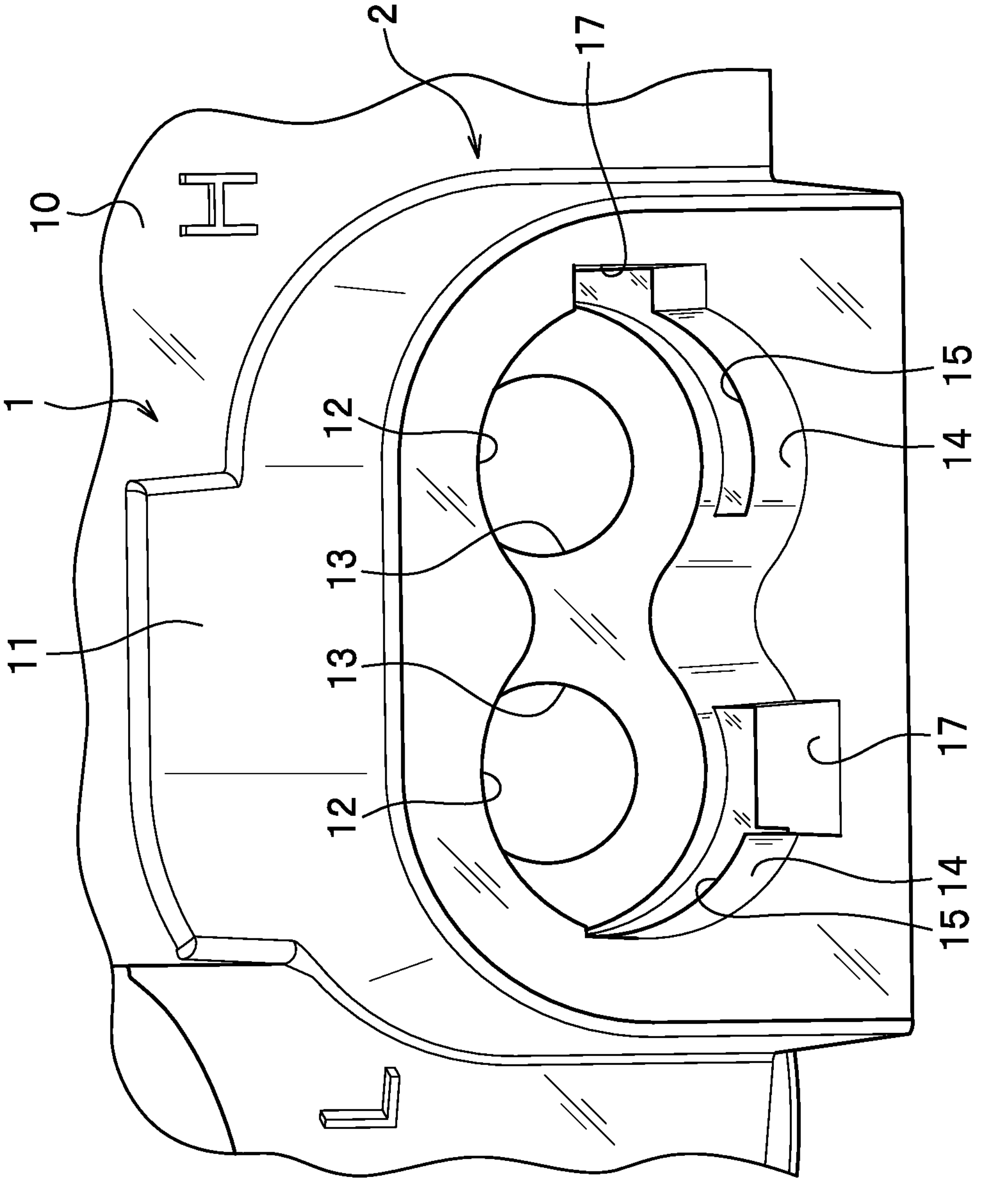
FIG. 6 is a front view showing a regulation hole of the fuel regulating device according to the embodiment of the present invention.

In the main body portion 10 of the present embodiment, the regulation hole 12 disposed on the left side of FIG. 6 is a hole portion for regulating an air-fuel ratio of the air-fuel mixture when an output shaft of the internal combustion engine rotates at a low speed. In addition, the regulation hole 12 disposed on the right side of FIG. 6 is a hole portion for regulating an air-fuel ratio of the air-fuel mixture when the output shaft of the internal combustion engine rotates at a high speed. Note that FIG. 6 shows a state in which the flow control restrictors 3 (see FIG. 3) which are described later are removed from inside the regulation holes 12.

In the present embodiment, the configurations of the regulation holes 12 and 12 as well as the two flow control restrictors 3 and 3 mounted respectively into the regulation holes 12 and 12 are the same. Hence, in the following description, the regulation hole 12 disposed on the left side of FIG. 6 and the flow control restrictor 3 mounted into the regulation hole 12 are described, and the description of the regulation hole 12 disposed on the right side of FIG. 6 and the flow control restrictor 3 attached into the regulation hole 12 is omitted.

Figure 2:
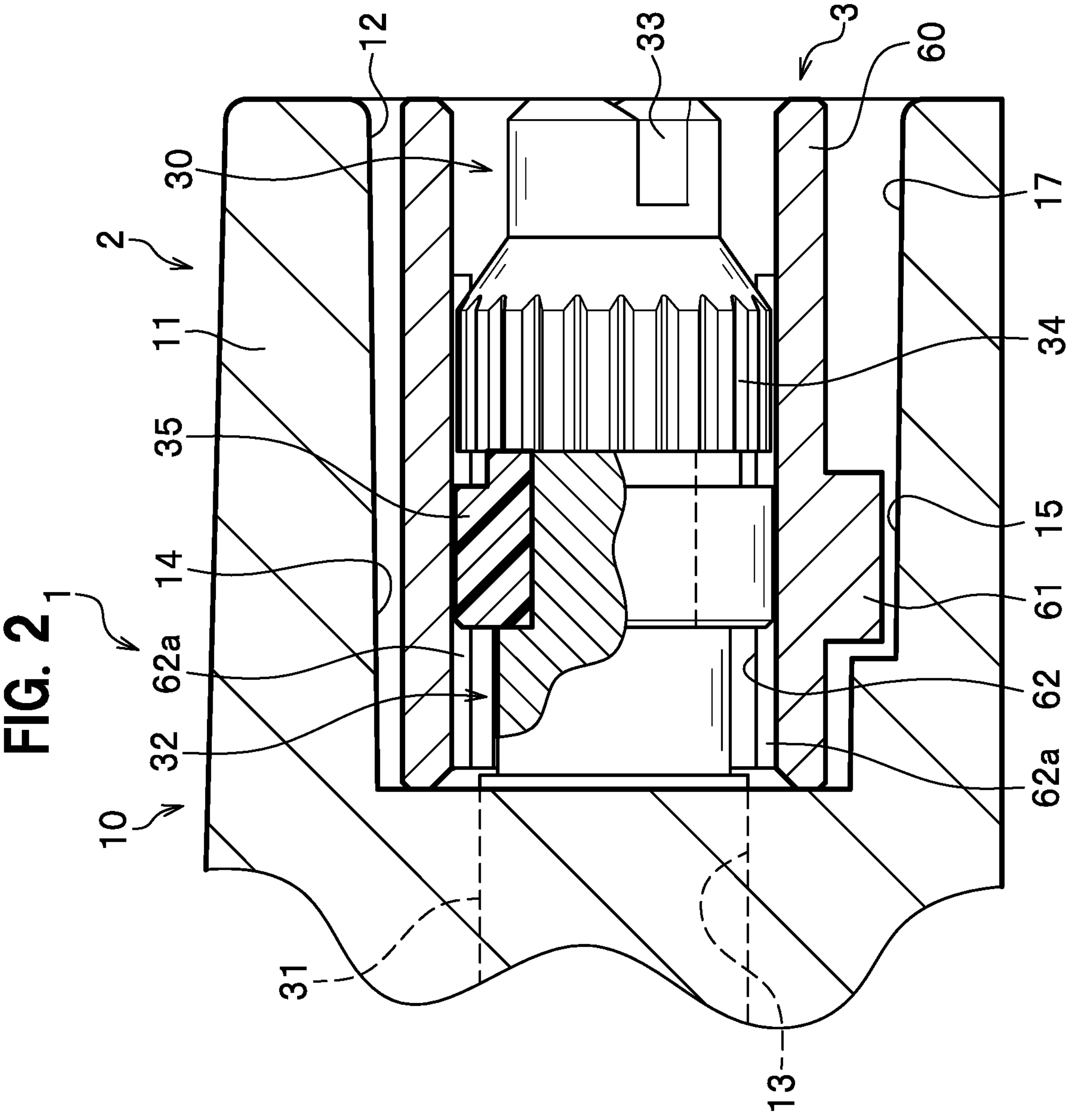
FIG. 2 is a sectional side view showing a protruding portion of the fuel regulating device according to the embodiment of the present invention.

As shown in FIG. 2, a first hole portion 13 is formed in a portion on the inner end side of the regulation hole 12 (on the flow passage side of the main body portion 10), and a second hole portion 14 is formed in a portion on the outer end side of the regulation hole 12 (on the front end side of the protruding portion 11).

Figure 5:
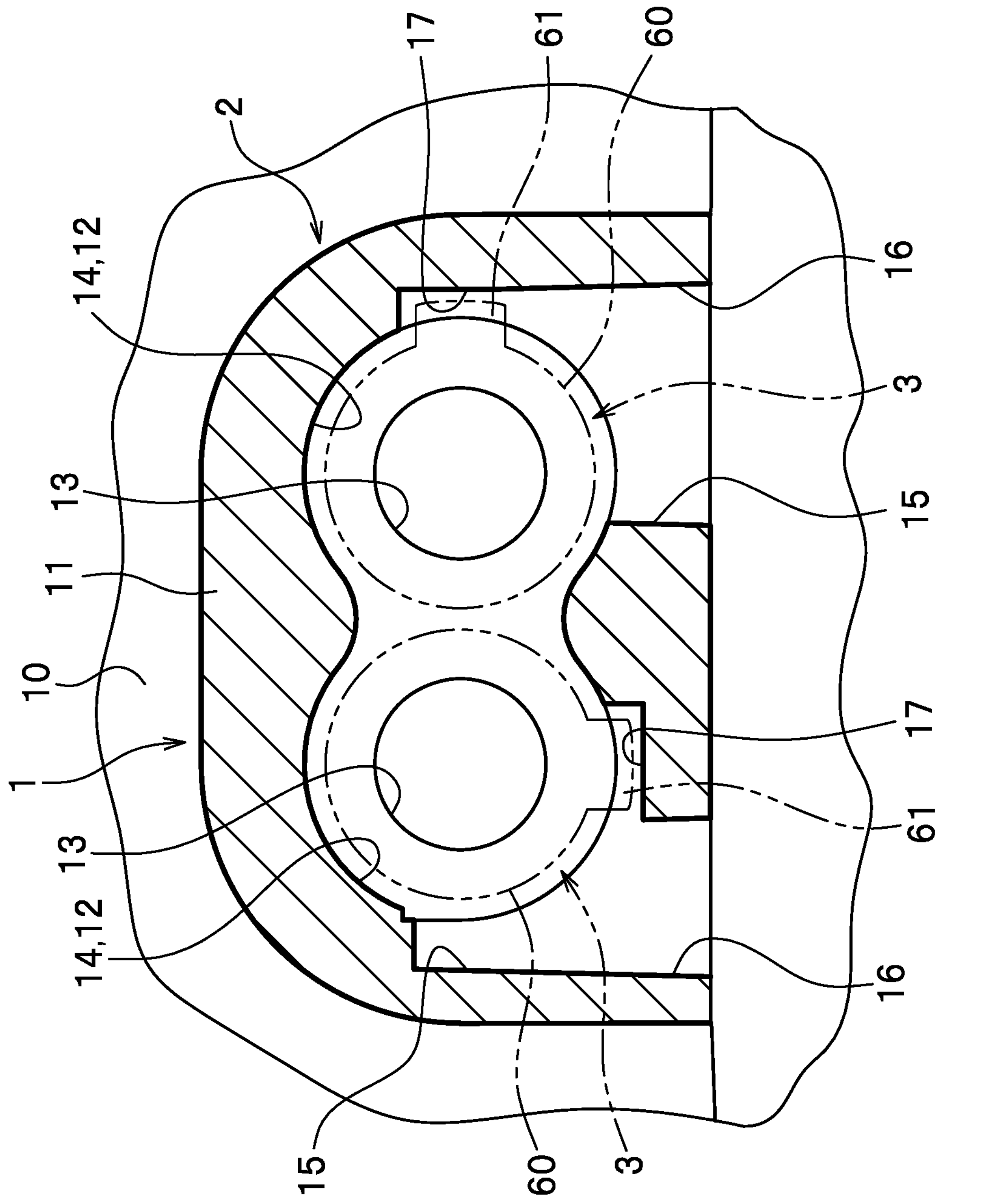
FIG. 5 is a sectional view taken along a line V-V in FIG. 1, showing the fuel regulating device according to the embodiment of the present invention.

The first hole portion 13 is a hole portion which has a circular cross section and communicates with the flow passage inside the main body portion 10 (see FIG. 5). On an inner peripheral surface of the first hole portion 13, a thread groove is formed.

The second hole portion 14 is a hole portion having a larger diameter than that of the first hole portion 13, and is open on the front-end surface of the protruding portion 11. On a bottom surface of the second hole portion 14, the first hole portion 13 is open.

Note that in the present embodiment, as shown in FIG. 6, side portions of the respective second hole portions 14 and 14 of the two regulation holes 12 and 12 are joined, so that the second hole portions 14 and 14 form a single hole portion.

In an inner peripheral surface of the second hole portion 14, a restriction groove 15 is formed in an intermediate portion in an axial direction. As shown in FIG. 5, the restriction groove is a portion recessed in the inner peripheral surface of the second hole portion 14, and extends in a circumferential direction of the second hole portion 14. The restriction groove 15 of the present embodiment is formed within an angle range of substantially 90 degrees in the circumferential direction of the regulation hole 12 about the central axis of the regulation hole 12 as a central point.

Figure 7:
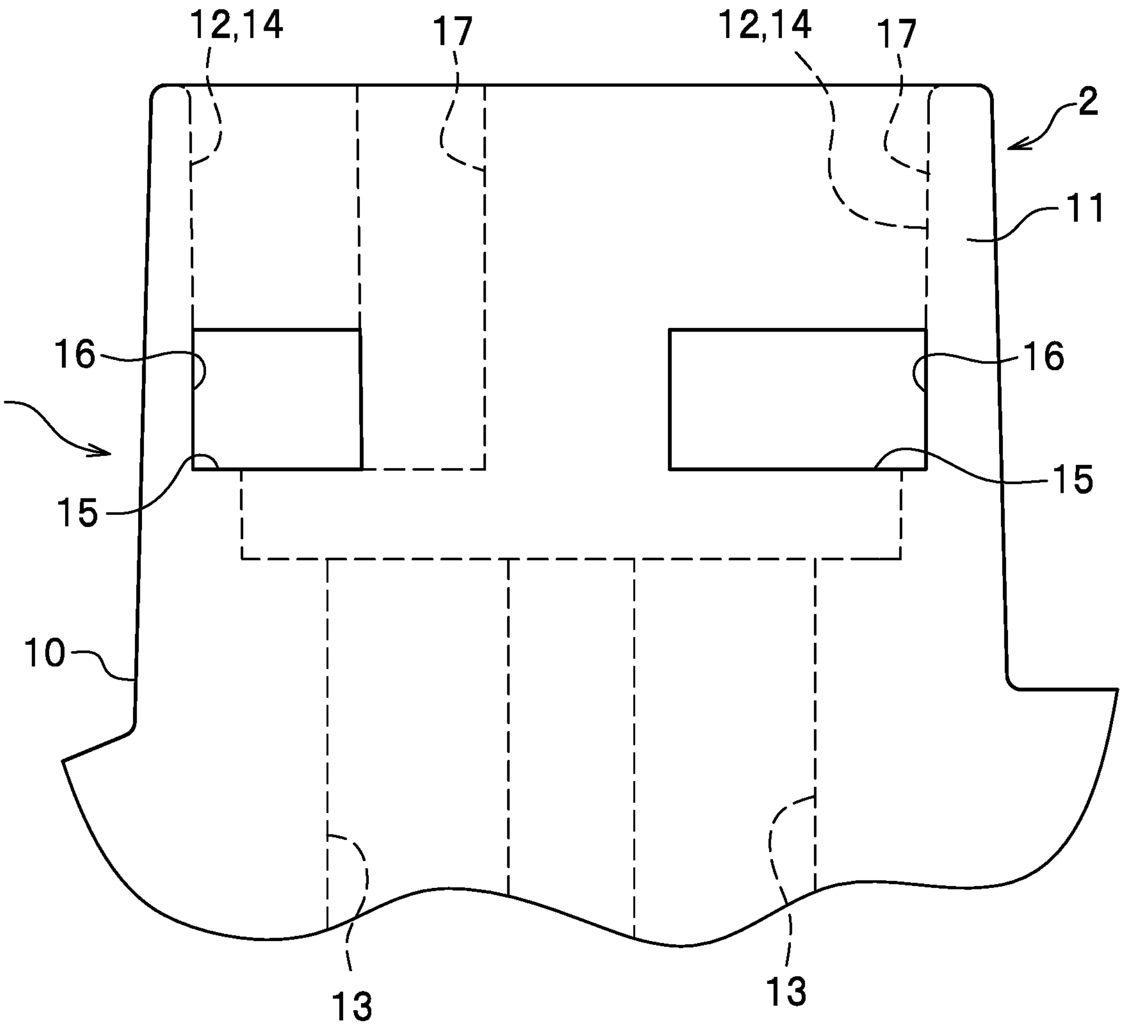
FIG. 7 is a bottom view showing the protruding portion of the fuel regulating device according to the embodiment of the present invention.

In the present embodiment, a cast hole 16 penetrates from the restriction groove 15 through the bottom surface of the main body portion 10 (see FIG. 7). The cast hole 16 linearly extends in a direction intersecting the axial direction of the second hole portion 14 (the regulation hole 12).

The cast hole 16 is a hole portion that is naturally formed when the main body portion 10 is cast. At the time of casting the main body portion 10, a casting mold that extends from the second hole portion 14 in the direction intersecting the axial direction of the second hole portion 14 is disposed. By removing this casting mold in the direction intersecting the axial direction of the second hole portion 14, the restriction groove 15 is formed in the inner peripheral surface of the second hole portion 14. At this time, the cast hole 16 is formed from the restriction groove through the bottom surface of the main body portion 10.

Note that in a case where the casting mold for forming the restriction groove 15 is removed in the axial direction of the second hole portion 14, a groove portion having the same width as that of the restriction groove 15 is formed from the restriction groove 15 through an outer end edge of the second hole portion 14. That is, the diameter of an outer end portion of the second hole portion 14 is increased.

In contrast, in the present embodiment, by removing the casting mold for forming the restriction groove 15 in the direction intersecting the axial direction of the second hole portion 14, it is possible to form the restriction groove 15 in an intermediate portion in the axial direction of the inner peripheral surface of the second hole portion 14 without increasing the diameter of the outer end portion of the second hole portion 14 as shown in FIG. 6.

In the inner peripheral surface of the second hole portion 14, a guide groove 17 extending in the axial direction is formed on the outer end side relative to the restriction groove 15 (the front end side of the protruding portion 11) as shown in FIG. 2. An inner end portion of the guide groove 17 communicates with the restriction groove 15, and an outer end portion of the guide groove 17 is open in the front-end surface of the protruding portion 11. The guide groove 17 is a portion through which a projecting portion 61 of a limit cap 60, which is described later, passes when the limit cap 60 is inserted into the regulation hole 12 from outside.

As shown in FIG. 1, the flow control restrictor 3 of the present embodiment includes: a needle valve 30 which is inserted into the regulation hole 12; and the limit cap 60 which is attached to the needle valve 30. The needle valve 30 is a member for regulating an air-fuel ratio of an air-fuel mixture.

Figure 3:
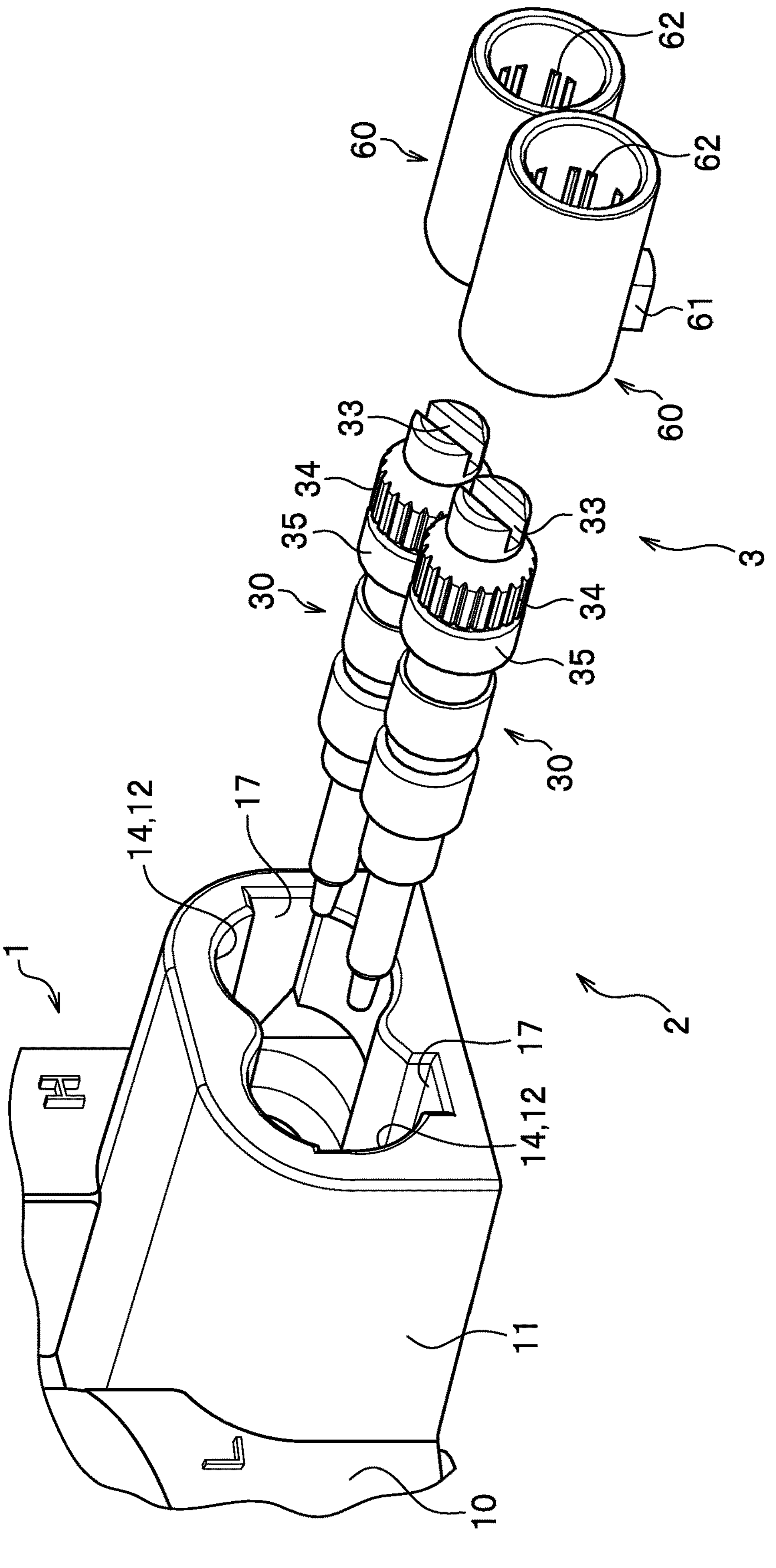
FIG. 3 is an exploded perspective view showing the fuel regulating device according to the embodiment of the present invention.

As shown in FIG. 3, the needle valve 30 is a linear member having a circular cross section as a whole. As shown in FIG. 2, a first shaft portion 31 is formed in a portion on the inner end side of the needle valve 30 (on the left side of FIG. 2), and a second shaft portion 32 is formed in a portion on the outer end side of the needle valve 30 (on the right side of FIG. 2) (see FIG. 3). The first shaft portion 31 and the second shaft portion 32 of the needle valve 30 are members made of metal.

In the state of being mounted into the regulation hole 12, the first shaft portion 31 is a portion that is disposed on the inner end side of the needle valve 30 (on the left side of FIG. 2) and inserted into the first hole portion 13 of the regulation hole 12. In an outer peripheral surface of the first shaft portion 31, a thread groove is formed, and the first shaft portion 31 is screwed into the thread groove formed in the inner peripheral surface of the first hole portion 13.

By rotating the needle valve 30 around the axis to increase or decrease the amount of insertion of the needle valve 30 into the first hole portion 13 and to adjust the amount of protrusion of the needle valve 30 into the flow passage, it is possible to regulate the flow rate of the fuel flowing through the flow passage. In this way, the air-fuel ratio of the air-fuel mixture can be regulated by rotating the needle valve 30 around the axis.

The second shaft portion 32 is a portion that is joined to the first shaft portion 31, and is disposed on the outer end side (on the right side of FIG. 2) relative to the first shaft portion 31 in the state of being mounted into the regulation hole 12 and housed inside the second hole portion 14 of the regulation hole 12.

In the front-end surface of the second shaft portion 32, as shown in FIG. 3, a front-end groove 33 for rotating the needle valve 30 around the axis by using a tool such as a screwdriver is formed.

Note that although in the present embodiment, the front-end groove 33 is linearly formed such that a front-end portion of a flathead screwdriver is engaged with the front-end groove 33, the tool for rotating the needle valve 30 is not limited. For example, a cross-shaped groove portion may be formed in the front-end surface of the second shaft portion 32 for a Phllips screwdriver, or a hexagon socket may be formed in the front-end surface of the second shaft portion 32 for a hex wrench.

On an outer peripheral surface of the second shaft portion 32, as shown in FIG. 3, a first projection-and-recess portion 34 is formed over the entire circumference by knurling (linear knurling).

The first projection-and-recess portion 34 is a portion in which a plurality of linear grooves extending in the axial direction of the needle valve 30 are arranged at equal intervals in the circumferential direction of the second shaft portion 32.

Note that although in the present embodiment, the first projection-and-recess portion 34 is formed on the outer peripheral surface of the second shaft portion 32 by knurling, the method for formation is not limited. For example, the first projection-and-recess portion 34 may be formed by performing cutting, mounting another component, molding, or the like on the second shaft portion 32.

As shown in FIG. 2, on the outer peripheral surface of the second shaft portion 32, a pressed portion 35 which is press-fitted into the limit cap 60 described later is provided on the first shaft portion 31 side relative to the first projection-and-recess portion 34. The pressed portion 35 is an annular portion which is made of resin and fitted onto the second shaft portion 32 (see FIG. 3).

The pressed portion 35 is molded integrally on the second shaft portion 32 by insert molding. In this way, the needle valve 30 is a single component formed with the first shaft portion 31 and the second shaft portion 32, which are made of metal, and the pressed portion 35, which is made of resin.

The limit cap 60 is a cylindrical member which is made of metal and fitted onto the second shaft portion 32 of the needle valve 30 (see FIG. 3). The limit cap 60 is fitted onto the needle valve 30 and housed inside the second hole portion 14 in the state of being mounted into the regulation hole 12.

On an outer peripheral surface of the limit cap 60, as shown in FIG. 3, a projecting portion 61 protrudes. The projecting portion 61 of the present embodiment is formed slightly on the base end side (on the inner end side) relative to a center portion in the axial direction on the outer peripheral surface of the limit cap 60.

Figure 4:
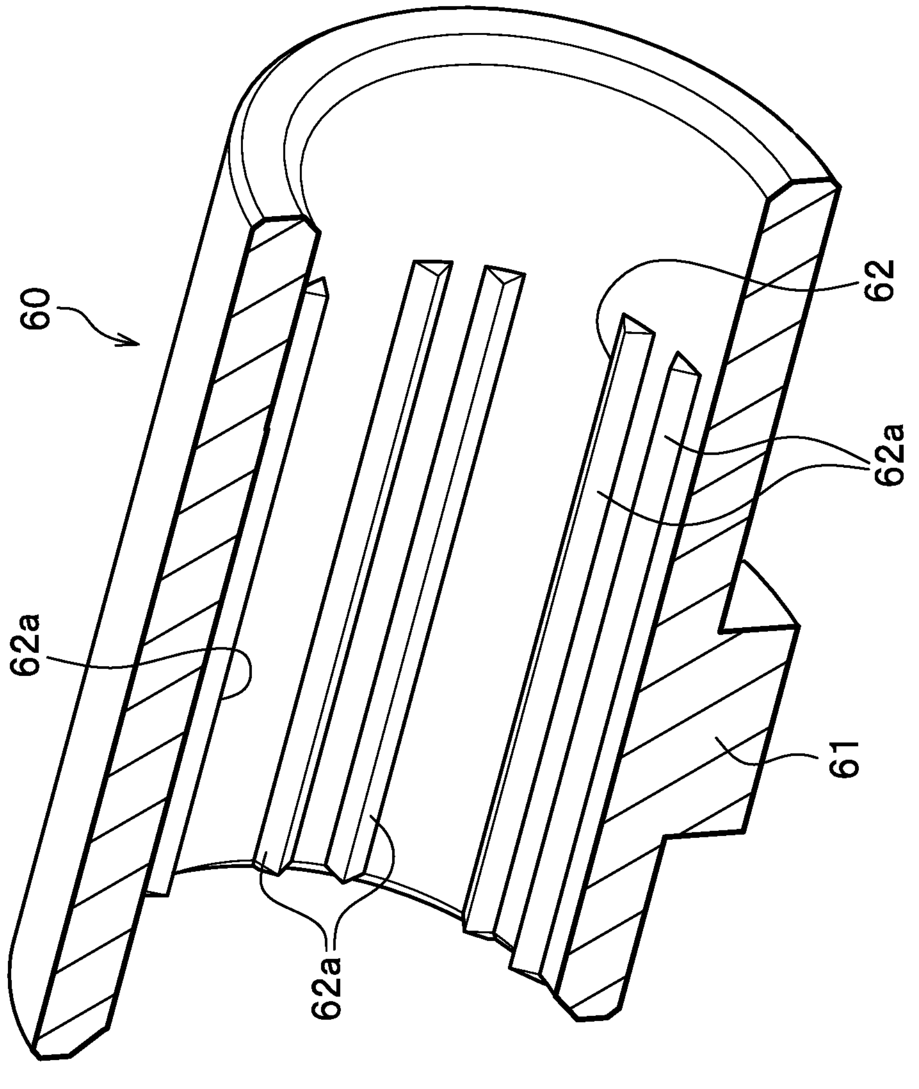
FIG. 4 is a sectional perspective view showing a limit cap of a flow control restrictor according to the embodiment of the present invention.

On an inner peripheral surface of the limit cap 60, a second projection-and-recess portion 62 is formed over the entire circumference. As shown in FIG. 4, the second projection-and-recess portion 62 is a portion in which a plurality of linear projections **62*a* extending in the axial direction of the limit cap 60 are arranged in the circumferential direction of the limit cap 60**.

In the present embodiment, sets of two projections **62*a* and 62*a* are arranged at intervals in the circumferential direction of the limit cap 60. In this configuration, the number of the projections 62*a* is smaller than in the case where the single projections 62*a* are arranged at equal intervals in the circumferential direction of the limit cap 60**.

As shown in FIG. 2, in the state in which the limit cap 60 is fitted onto the second shaft portion 32 of the needle valve 30, the second projection-and-recess portion 62 of the limit cap 60 and the first projection-and-recess portion 34 of the needle valve 30 are engaged with each other in the circumferential direction of the limit cap 60 and the needle valve 30. This allows the limit cap 60 to rotate around the axis in conjunction with the rotation of the needle valve 30 around the axis.

In the state in which the limit cap 60 is housed inside the second hole portion 14, the entire projecting portion 61 of the limit cap 60 is disposed inside the restriction groove 15.

When the limit cap 60 rotates in the circumferential direction, the projecting portion 61 shown in FIG. 5 comes into contact with an end surface of the restriction groove 15 in the circumferential direction, and hence, the projecting portion 61 is capable of moving around the axis of the regulation hole 12 within a range of a rotation angle of 90 degrees. In this way, the limit cap 60 is capable of rotating by ¼ around the axis. In addition, the needle valve 30 on which the limit cap 60 is fitted is also capable of rotating by ¼ around the axis.

As shown in FIG. 2, when the limit cap 60 is inserted into the second hole portion 14, the orientation of the limit cap 60 around the axis is adjusted such that the projecting portion 61 passes through the guide groove 17.

Then, in the state in which the limit cap 60 is inserted into the second hole portion 14 and an inner end edge portion of the limit cap 60 is in contact with the bottom surface of the second hole portion 14, the entire projecting portion 61 is disposed inside the restriction groove 15 on the inner side relative to the guide groove 17. At this time, as shown in FIG. 5, the projecting portion 61 is disposed on one end in the circumferential direction in an axial cross section of the restriction groove 15.

In the state in which the limit cap 60 is housed inside the second hole portion 14, the projecting portion 61 is not engaged with the guide groove 17, and the limit cap 60 is thus capable of rotating around the axis inside the second hole portion 14.

In the flow control restrictor 3, as shown in FIG. 2, when the limit cap 60 is fitted onto the second shaft portion 32 of the needle valve 30, the pressed portion 35 of the needle valve 30 is pressed against an inner peripheral surface of the second projection-and-recess portion 62 of the limit cap 60.

The minimum inner diameter of the second projection-and-recess portion 62 (the inner diameter at the apex of each projection **62*a*) is formed to be smaller than the maximum outer diameter of the pressed portion 35 of the needle valve 30. As the limit cap 60 is fitted from the front end side of the needle valve 30 to the base end side thereof, the pressed portion 35 of the needle valve 30 is press-fitted into the second projection-and-recess portion 62 of the limit cap 60. At this time, each projection 62*a* of the second projection-and-recess portion 62 made of metal bites into the outer peripheral surface of the pressed portion 35 made of resin. That is, the pressed portion 35 is press-fitted and fixed into the second projection-and-recess portion 62 while the outer peripheral surface of the pressed portion 35 is scraped by the apex of each projection 62***a* of the second projection-and-recess portion 62.

In this way, the needle valve 30 is press-fitted into the limit cap 60, so that the needle valve 30 and the limit cap 60 are fixed in the axial direction.

Next, a procedure for mounting the flow control restrictor 3 into the regulation hole 12 of the fuel regulator 2 shown in FIG. 1 is described.

First, as shown in FIG. 2, the first shaft portion 31 of the needle valve 30 is inserted into the first hole portion 13 of the regulation hole 12, and the thread groove of the first shaft portion 31 is screwed into the thread groove of the first hole portion 13.

Then, by rotating the needle valve 30 around the axis to increase or decrease the amount of insertion of the needle valve 30 into the first hole portion 12 and to adjust the amount of protrusion of the inner end portion of the needle valve 30 into the flow passage, the air-fuel ratio of the air-fuel mixture is regulated.

Thereafter, the limit cap 60 is inserted into the regulation hole 12 from outside. At this time, the projecting portion 61 of the limit cap 60 is caused to pass through the guide groove 17 of the second hole portion 14 of the regulation hole 12.

As the limit cap 60 is moved to the inner end side of the regulation hole 12, the second projection-and-recess portion 62 of the limit cap 60 moves relative to the first projection-and-recess portion 34 of the needle valve 30 in the axial direction and meshes with the first projection-and-recess portion 34 of the needle valve 30. In this way, the second projection-and-recess portion 62 of the limit cap 60 and the first projection-and-recess portion 34 of the needle valve 30 are engaged with each other in the circumferential direction.

In addition, the pressed portion 35 of the needle valve 30 is press-fitted into the second projection-and-recess portion 62 of the limit cap 60, so that the needle valve 30 and the limit cap are fixed to each other in the axial direction.

In the present embodiment, as shown in FIG. 4, since the intervals of the projections 62*a* of the second projection-and-recess portion 62 of the limit cap 60 are large, the second projection-and-recess portion 62 and the first projection-and-recess portion 34 mesh with each other and are fixed without displacement of the set degree of opening (the position of the needle valve 30 in the circumferential direction). In this way, even when the pressed portion 35 of the needle valve 30 shown in FIG. 2 is press-fitted into the second projection-and-recess portion 62 of the limit cap 60, the needle valve 30 and the limit cap 60 can be fixed without displacement of the degree of opening.

When the limit cap 60 is attached to the second shaft portion 32 of the needle valve 30 in this way, the projecting portion 61 of the limit cap 60 is disposed on one end in the circumferential direction in the axial cross section of the restriction groove 15, as shown in FIG. 5.

Then, the projecting portion 61 is capable of rotating clockwise (turning right) in FIG. 5 by ¼ inside the restriction groove 15, where the state in which the projecting portion 61 is disposed on the one end in the circumferential direction in the axial cross section of the restriction groove 15 is considered as a reference position.

In this way, the limit cap 60 and the needle valve 30 are capable of rotating clockwise (turning right) in FIG. 5 by ¼ from the reference position at which the needle valve 30 is mounted into the regulation hole 12 and the air-fuel ratio of the air-fuel mixture is properly regulated.

The present embodiment is set such that when the needle valve 30 is rotated clockwise in FIG. 5 from the reference position, the flow rate of the fuel passing through the flow passage decreases, so that the concentration of the fuel in the air-fuel mixture decreases.

Since the projecting portion 61 cannot rotate counterclockwise (turn left) in FIG. 5 beyond the reference position due to the restriction groove 15, the needle valve 30 cannot be rotated counterclockwise in FIG. 5 beyond the reference position. In this way, the present embodiment is configured such that the concentration of the fuel in the air-fuel ratio within the movable range of the limit cap 60 is not higher than that in the air-fuel ratio of the air-fuel mixture at the position of the needle valve 30 that is set as the reference position.

As shown in FIG. 2, the flow control restrictor 3 as described above includes: the needle valve 30, which is inserted into the regulation hole 12 formed in the main body portion 10 of the fuel regulating device 1, which is a carburetor; and the limit cap 60, which is made of metal and attached to the needle valve 30.

In the needle valve 30, the first shaft portion 31, which is made of metal and screwed into the first hole portion 13 formed on the inner side of the regulation hole 12, and the second shaft portion 32, which is made of metal and housed inside the second hole portion 14 formed on the outer side of the regulation hole 12, are formed.

The first projection-and-recess portion 34 is formed on the outer peripheral surface of the second shaft portion 32, and the pressed portion 35 which is made of resin is provided on the first shaft portion 31 side relative to the first projection-and-recess portion 34 on the outer peripheral surface of the second shaft portion 32. This pressed portion 35 is molded integrally on the second shaft portion 32.

The projecting portion 61 which is inserted into the restriction groove 15 for rotation restriction which is formed in the inner peripheral surface of the second hole portion 14, is formed on the outer peripheral surface of the limit cap 60. In addition, the second projection-and-recess portion 62 which is engaged with the first projection-and-recess portion 34 of the needle valve 30 in the circumferential direction of the limit cap 60 is formed on the inner peripheral surface of the limit cap 60.

Then, the pressed portion 35 of the needle valve 30 is configured to be pressed against the second projection-and-recess portion 62 on the inner peripheral surface of the limit cap 60.

In the flow control restrictor 3 of the present embodiment, as shown in FIG. 5, the projecting portion 61 of the limit cap 60 is disposed inside the restriction groove 15 of the regulation hole 12 of the main body portion 10, and the movement of the projecting portion 61 is restricted by the restriction groove 15, so that the rotation of the needle valve 30 is restricted.

In this way, it is possible to keep the concentration of the fuel in the air-fuel mixture within a proper range.

In the flow control restrictor 3 of the present embodiment, as shown in FIG. 1, the entire front-end portion of the limit cap 60 is open. In this configuration, since the front-end portion of a general-purpose tool such as a screwdriver can be inserted inside from the front end of the limit cap 60 and engaged with the needle valve 30, it is easy to regulate the air-fuel ratio of the air-fuel mixture. In other words, since the opening of the front-end surface of the limit cap 60 is wide, a special tool (for example, one having a tapered front end) is unnecessary. In addition, since the front-end portion of a tool can be easily inserted into the front-end groove 33 of the needle valve 30 with precision, the front-end groove 33 is unlikely to deform.

In the flow control restrictor 3 of the present embodiment, as shown in FIG. 2, since the first projection-and-recess portion 34 of the needle valve 30 and the second projection-and-recess portion 62 of the limit cap 60 are made of metal and unlikely to deform, the needle valve 30 and the limit cap 60 can be engaged with each other at a desired position in the circumferential direction without fail. This makes it possible to prevent the needle valve 30 from rotating around the axis relative to the limit cap 60, and to thus prevent a reference value of the air-fuel ratio of the air-fuel mixture from shifting.

In the flow control restrictor 3 of the present embodiment, since the pressed portion 35 of the needle valve 30 is made of resin, which is more flexible than metal, when the pressed portion is pressed against the second projection-and-recess portion 62 of the limit cap 60, each projection 62*a* of the second projection-and-recess portion 62 bites into the outer peripheral surface of the pressed portion 35. In the present embodiment, the apex of each projection 62*a* provided on the inner surface of the limit cap 60, which is made of metal, bites into the outer peripheral surface of the pressed portion 35, which is formed of resin, and is fixed while scraping the pressed portion 35. This makes it possible to fix the limit cap 60 relative to the needle valve 30 in the axial direction without fail, and to thus prevent undesirable rotation.

In the needle valve 30 of the flow control restrictor 3 of the present embodiment, since the first shaft portion 31 and the second shaft portion 32, which are made of metal, and the pressed portion 35, which is made of resin, are integrally molded by insert molding, it is possible to reduce the number of components of the flow control restrictor 3. This can reduce the assembly time for the fuel regulating device 1, and thus can improve the production efficiency.

In the fuel regulator 2 of the present embodiment, the guide groove 17 which extends in the axial direction of the second hole portion 14 is formed from the restriction groove 15 through the outer surface of the main body portion 10 in the inner peripheral surface of the second hole portion 14. Then, the projecting portion 61 formed on the outer peripheral surface of the limit cap 60 is capable of passing through the guide groove 17.

In addition, in the main body portion 10 of the fuel regulator 2 of the present embodiment, as shown in FIG. 5, the cast hole 16 which extends in the direction intersecting the axial direction of the second hole portion 14 is formed from the restriction groove 15 through the outer surface of the main body portion 10.

In such a fuel regulator 2, since the restriction groove 15 is formed in the inner peripheral surface of the regulation hole 12 by removing the casting mold for forming the restriction groove in the direction intersecting the axial direction of the second hole portion 14, there is no need to increase the diameter of the outer end portion of the regulation hole 12.

Hence, in the fuel regulator 2 of the present embodiment, it is possible to reduce the size of the gap between the inner peripheral surface of the outer end portion of the regulation hole 12 and the outer peripheral surface of the limit cap 60 without attaching any component to the outer end portion of the regulation hole 12.

This makes it possible, in the fuel regulator 2 of the present embodiment, to compactly form the main body portion 10, and to reduce the number of components and to thus reduce the assembly time.

In addition, in the fuel regulator 2 of the present embodiment, since the cast hole 16 penetrates from the restriction groove 15 through the bottom surface of the main body portion 10, the cast hole 16 is unlikely to be noticed, and dust is unlikely to enter the cast hole 16.

Although the present invention of the present invention has been described so far, the present invention is not limited to the above-described embodiment, and modifications can be made as appropriate without departing from the gist of the present invention.

Although in the present embodiment, the fuel regulator 2 and the flow control restrictor 3 used in the fuel regulating device 1, which is a carburetor of an internal combustion engine of a small-sized working machine such as a chainsaw or a blower are described as shown in FIG. 1, devices to which the present invention can be applied are not limited.

Although in the present embodiment, the projecting portion 61 of the limit cap 60 is capable of rotating by ¼ inside the restriction groove 15 as shown in FIG. 5, the shapes of the projecting portion 61 and the restriction groove 15 or the range within which the projecting portion 61 is capable of rotating are not limited, and may be set as appropriate to meet the necessary amount of regulation.

In the present embodiment, the restriction groove 15 is formed by removing the casting old for forming the restriction groove 15 in the direction intersecting the axial direction of the second hole portion 14. Although this method makes it possible to form the restriction groove 15 in the simplest manufacturing steps, the restriction groove 15 can also be formed by removing a casting mold for forming the second hole portion 14 and the restriction groove 15 in the axial direction of the second hole portion 14, and fitting another annular member into the outer end portion of the regulation hole 12.

Although the flow rate of the fuel is regulated in the fuel regulator 2 and the flow control restrictor 3 of the present embodiment shown in FIG. 1, the flow rate of the air may be regulated by using the present invention.

What is claimed is:

1. A flow control restrictor, comprising:

a needle valve which is inserted into a regulation hole formed in a fuel regulating device; and a limit cap which is made of metal and attached to the needle valve, wherein in the needle valve, a first shaft portion which is made of metal and screwed into a first hole portion formed on an inner side of the regulation hole, and a second shaft portion which is made of metal and housed inside a second hole portion formed on an outer side of the regulation hole are formed, a first projection-and-recess portion is formed on an outer peripheral surface of the second shaft portion, a pressed portion which is made of resin is provided on the first shaft portion side relative to the first projection-and-recess portion on the outer peripheral surface of the second shaft portion, the limit cap is fitted onto the second shaft portion, a projecting portion which is inserted into a restriction groove for rotation restriction which is formed in an inner peripheral surface of the second hole portion is formed on an outer peripheral surface of the limit cap, a second projection-and-recess portion which is engaged with the first projection-and-recess portion in a circumferential direction of the limit cap is formed on an inner peripheral surface of the limit cap, the pressed portion of the needle valve is pressed against the inner peripheral surface of the limit cap, the pressed portion of the needle valve is pressed against the second projection-and-recess portion of the limit cap, the second projection-and-recess portion is a portion in which a plurality of linear projections extending in the axial direction of the limit cap are arranged in the circumferential direction of the limit cap, and each projection of the second projection-and-recess portion bites into the outer peripheral surface of the pressed portion.

2. The flow control restrictor according to claim 1, wherein a minimum inner diameter of the second projection-and-recess portion is set to be smaller than a maximum outer diameter of the pressed portion.

3. The flow control restrictor according to claim 1, wherein the pressed portion is formed integrally on the second shaft portion.

4. The flow control restrictor according to claim 1, wherein the fuel regulating device is a carburetor.

* * * * *